March 15, 1938.    R. T. SAWYER    2,111,130
ELECTRIC MOTOR DRIVEN RAILWAY VEHICLE
Filed Aug. 13, 1937    2 Sheets-Sheet 1
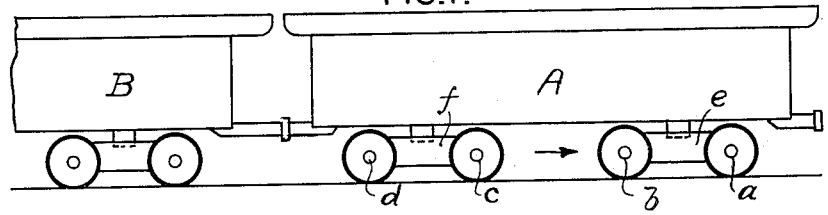
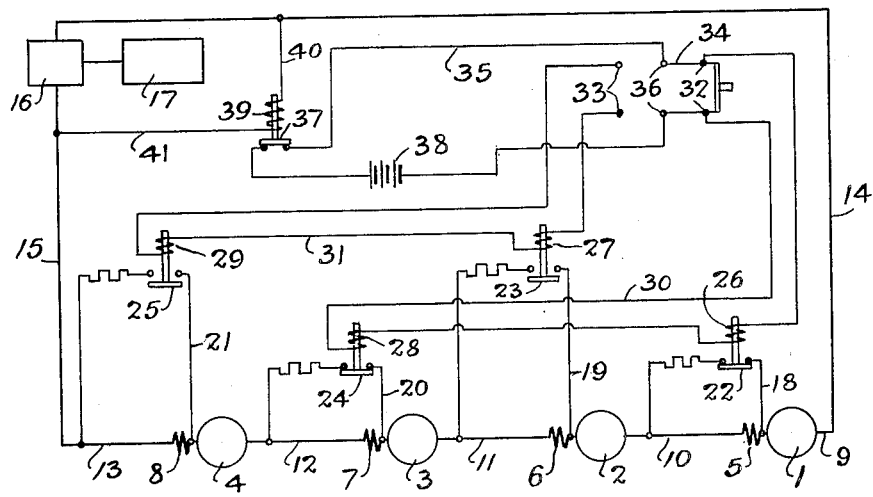
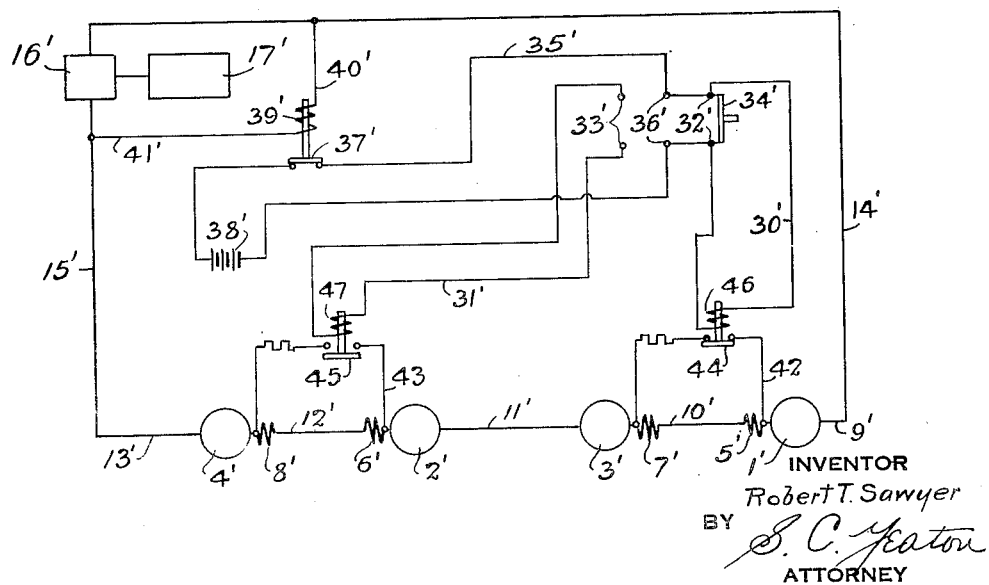
INVENTOR
Robert T. Sawyer
BY
S. C. Yeaton
ATTORNEY March 15, 1938.  R. T. SAWYER  2,111,130
ELECTRIC MOTOR DRIVEN RAILWAY VEHICLE
Filed Aug. 13, 1937  2 Sheets-Sheet 2
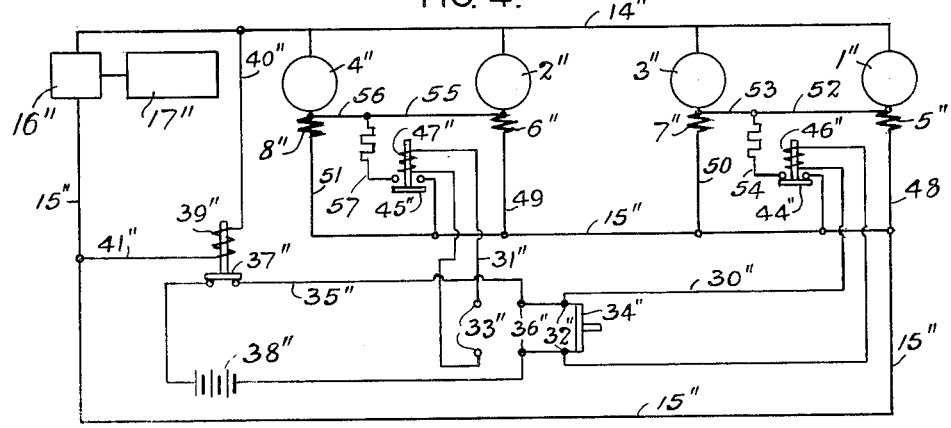
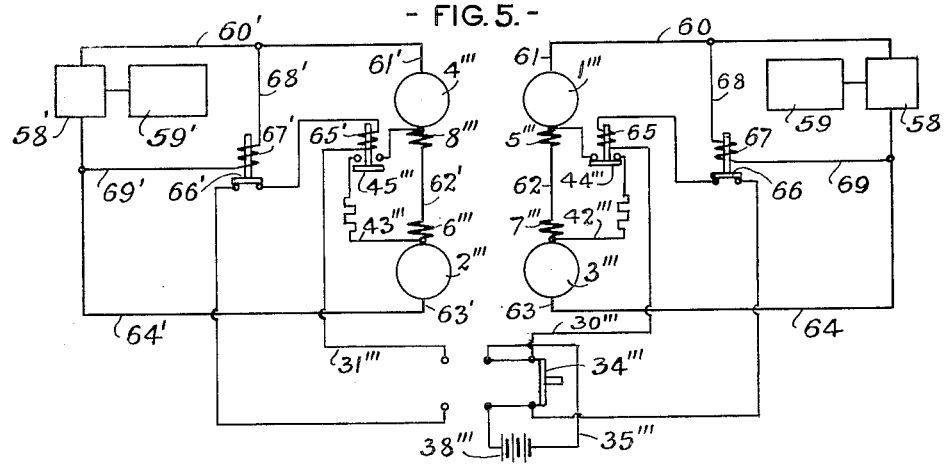
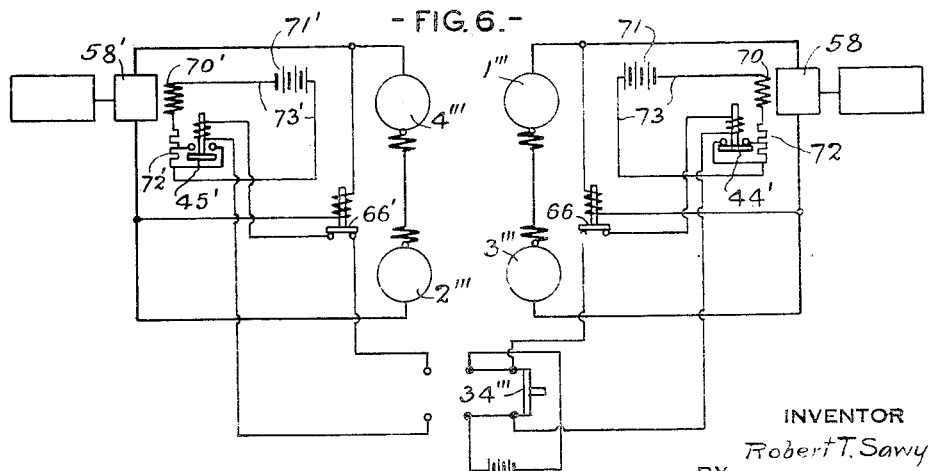
INVENTOR
Robert T. Sawyer
BY
S. C. Yeaton
ATTORNEY Patented Mar. 15, 1938

2,111,130

UNITED STATES PATENT OFFICE 2,111,130

ELECTRIC MOTOR DRIVEN RAILWAY VEHICLE

Robert T. Sawyer, Ridgewood, N. J., assignor to American Locomotive Company, New York, N. Y., a corporation of New York Application August 13, 1937, Serial No. 158,824

8 Claims. (Cl. 172—179)

This invention relates to electric motor driven railway vehicles, and more particularly to locomotives.

It is well known that the motor driven axles of locomotives are subject to load variation under certain service conditions. This variation is particularly noticeable at starting and in vehicles where the superstructure is supported upon one or more trucks, the axles of which are motor driven. During the starting operation of the electric motor driven locomotive or other railway vehicle the front axle of each truck employed is relieved of part of its load which often causes the wheels of these axles to slip, due to the then excessive power of the motors transmitted to them. This tendency to slip has been previously met by reducing the power transmitted to these wheels, but in all such prior instances the reduction of the power has been under manual control.

The principal object of the present invention is to render such control automatic. It is known that the voltage at the traction motors is in proportion to the motor speed, that is to say there is relatively low voltage at low motor speed. Consequently at locomotive starting speeds the voltage is comparatively low, and increases with the speed of the locomotive. This characteristic is availed of and accordingly a further object of the invention is the devising of automatically operating means, as aforementioned, controllable by change in voltage at the traction motor.

Referring to the accompanying drawings, Fig. 1 is a diagrammatic side elevation of a motor driven railway vehicle such as an electric locomotive and a fragmentary portion of a similar vehicle at the rear thereof and coupled thereto; Fig. 2 is a diagrammatic view of the control system illustrating the present invention, showing one embodiment thereof with the electric motors connected in series; Fig. 3 is a diagrammatic view showing a modification of the embodiment shown in Fig. 2; Fig. 4 is a diagrammatic view of another modification with the motors connected in parallel; Fig. 5 is a diagrammatic view of another modification with the motors on alternate axles connected in series forming two sets of motors, each supplied with current from a separate generator, the embodiment being more particularly a modification of the embodiment shown in Fig. 3; and Fig. 6 is a diagrammatic view of a modification of the embodiment shown in Fig. 5.

The railway vehicle shown in Fig. 1 is of the two-axle truck type employing two trucks and each of the embodiments of the invention shown in Figs. 2 to 6 illustrates the invention in connection with such a type of vehicle, but it will be understood that the invention is not restricted as to the number of axles or trucks and its application to other types will be apparent from the following description:

The arrow shown in Fig. 1 indicates forward movement of the vehicle, and each of the embodiments will be described more particularly in connection with forward movement. The operation for reverse movement will be obvious as being similar to that for forward movement. The forward vehicle is indicated generally by the reference letter A and the various embodiments refer to this vehicle, it being unnecessary to refer to the fragmentally shown vehicle indicated by the reference letter B to the rear of the vehicle A.

The vehicle A comprises wheeled axles $a$, $b$, $c$ and $d$. The axles $a$ and $b$ are part of a motor truck $e$ and the axles $c$ and $d$ are part of a motor truck $f$. Each axle is driven by a separate electric motor (not shown in this figure) in the usual manner. The axles $a$ and $c$ will be designated as the forward axles and the axles $b$ and $d$ as the rear axles, although it will be understood that when the vehicle is moving in reverse direction this order will be similarly reversed.

As previously stated it is the forward axles $a$ and $c$ that, on starting the vehicle in forward direction, lose some of their normal load. This is due to the lifting tendency of the forward ends of the trucks during this starting period and, as already stated, it is an object of this invention to decrease, during this period, the amount of power applied for driving the motors of these axles in order to prevent slipping of the wheels of these axles.

Referring to Fig. 2, the armatures of the motors for the four axles $a$, $b$, $c$ and $d$ are indicated respectively by the reference numerals 1, 2, 3 and 4, and similar to the axles the armatures 1 and 3 will be designated as the forward armatures, and the armatures 2 and 4 as the rear armatures; also similar remarks apply to each of the other embodiments wherein the armatures are designated by similar references with accents affixed.

The fields for the armatures 1 to 4 are indicated respectively by the reference numerals 5, 6, 7 and 8. The motors are connected in series by conductors 9, 10, 11, 12 and 13, the field 5 being in the conductor 10, 6 in the conductor 11, 7 in the conductor 12, and 8 in the conductor 13. The conductor 9 is connected by a conductor 14 and the conductor 13 by a conductor 15 to a dynamo 16 driven by an engine, such for instance as a Diesel engine, indicated at 17. A main circuit is thus completed from the dynamo through the respective motors for supplying current to the motors. It will be understood that in this circuit, as well as in the main circuits of the other embodiments, the usual controller device (not shown) is inserted at a suitable point to control the current supply from the dynamo to the various main circuits of the system, the control including the usual reversing feature. In fact this device, which is operated by the engineer, in common practice comprises various features, including contactors and switches which control the main circuit or circuits of the traction motors and the various auxiliary circuits of the locomotive for forward and backward movements.

The fields 5, 6, 7 and 8 are provided respectively with shunts 18, 19, 20 and 21 provided respectively with control switches 22, 23, 24 and 25. Each of the shunts in the various embodiments is provided with a resistance in the usual manner. The switches are provided respectively with actuating coils 26, 27, 28 and 29. The coils 26 and 28 are in one auxiliary circuit and the coils 27 and 29 are in another auxiliary circuit. The circuit of the coils 26 and 28 includes a conductor 30 and the circuit of the coils 27 and 29 includes a conductor 31. The conductor 30 leads leads to terminals 32 and the conductor 31 leads to terminals 33 of a hand operated knife switch 34. A conductor 35, leading to terminals 36, forms part of either one or the other of the circuits, depending upon which of its two positions the knife member of the switch 34 is shifted to.

In the conductor 35 is a relay 37, of any suitable well-known type, and a battery 38 for supplying current to the two auxiliary circuits of the coils 26—29. While a battery is shown for convenience, it will be understood that the required current may be supplied from any source, as for instance, under suitable conditions, from the dynamo 16.

The actuating coil 39 of the relay 37 is connected at one end by a conductor 40 to the conductor 14, and at its other end by a conductor 41 to the conductor 15, thereby receiving current from the dynamo 16, and this relay is of a type adapted in a well-known manner to be operated by a change in the voltage controlling it. That is to say, in the present instance, when the voltage drops to a predetermined point, as will occur when the locomotive or other motor driven railway vehicle is starting, this voltage will operate to close the relay and when the voltage rises to a predetermined point, as is the case when the locomotive or other vehicle has reached a speed of say two or three miles per hour, this voltage will operate to open the relay.

The operation of the system shown in Fig. 2 is as follows: Assuming the locomotive is to be started for forward movement, the control (not shown) is operated to start the locomotive in forward movement, thereby supplying current from the dynamo 16 to the armatures 1, 2, 3 and 4 in a usual manner, the switch 34 being in the position shown in Fig. 2. The voltage going to the coil 39, is, at this period of operation, sufficiently low to automatically close the relay 37. Current is thus supplied to the coils 26 and 28 to close the switches 22 and 24.

The circuit supplying this current comprises a portion of conductor 35 extending from switch 34 to battery 38, another portion extending from battery 38 to relay 37, relay 37, another portion extending from relay 37 to adjacent knife of switch 34, adjacent knife of switch 34, a portion of conductor 30 extending from said knife of switch 34 to coil 26, coil 26, another portion of conductor 30 extending from coil 26 to coil 28, coil 28, another portion of conductor 30 extending from coil 28 to the other knife of switch 34, and said last mentioned knife.

The closing of the switches 22 and 24 shunts part of the supply of current away from the fields 5 and 7 respectively and through the shunts 18 and 20 respectively. Thus the forward motors (armatures 1 and 3) for forward movement, during this starting period, are supplied with less power and accordingly drive their respective axles $a$ and $c$ with less power, thus preventing the wheels of these axles from slipping during this period of starting when they are relieved of part of their normal load. As soon as the locomotive attains a speed of say two or three miles per hour the voltage supplied to the coil 39 increases, which operates to automatically open the relay 37. The switches 22 and 24 thereupon open, the motors (armatures 1 and 3) thereby receiving their full normal supply of current for driving the axles $a$ and $c$, which is as it should be, as these axles will then be receiving their full portion of the load. During forward movement the switches 23 and 25 will remain open as the circuit containing their respective coils 27 and 29 is open. So long as the locomotive is running in forward movement the switch 34 should remain in the position shown in Fig. 2, and the relay 37 will automatically operate to close or open the circuit, including the coils 26 and 28, according to the speed of the locomotive in the manner and for the purpose already described.

When the control (not shown) is operated to start the locomotive in the reverse direction, switch 34 is first reversed from its position of contact with terminals 32 to its position of contact with terminals 33. The relay 37 operates similar to its operation for forward movement. Current is now supplied to coils 27 and 29 to close switches 23 and 25.

The circuit supplying this current comprises a portion of conductor 35 extending from switch 34 to battery 38, another portion of conductor 35 extending from battery 38 to relay 37, relay 37, another portion extending from relay 37 to the adjacent knife of switch 34, adjacent knife of switch 34, a portion of conductor 31 extending from said knife of switch 34 to coil 29, coil 29, another portion of conductor 31 extending from coil 29 to coil 27, coil 27, another portion of conductor 31 extending from coil 27 to the other knife of switch 34, and said last mentioned knife.

The closing of the switches 25 and 23 shunts part of the supply of current away from the fields 8 and 6 respectively, and through the shunts 21 and 19 respectively. Thus the forward motors (armatures 4 and 2) for rearward movement, during this starting period are supplied with less power, and from this point on the operations and results for reverse movement correspond to those for forward movement.

Fig. 3 shows a modification of the embodiment of Fig. 2. Similar parts are here indicated by similar reference numerals with accents added, and no detailed description is thought necessary except as bearing on the modified feature. For convenience of illustration the motors (armatures) of the diagram are placed out of the proper order which was followed in Fig. 2, armatures 2' and 3' being reversed in position so that armature 1' and 3', which are the forward armatures for forward movement, are adjacent each other, and armatures 2' and 4', forward armatures for rearward movement, are adjacent each other. Also the fields 7' and 8' are reversed in position, being shown at the opposite sides of their respective armatures from their positions in Fig. 2. Instead of the four shunts with their four control switches employed in the embodiment of Fig. 2 but two are used in the embodiment of Fig. 3, each including two fields.

The fields 5' and 7' are shunted by a single shunt 42, and the fields 6' and 8' are shunted by a single shunt 43. The shunt 42 is provided with a control switch 44 and the shunt 43 is provided with a control switch 45. The switch 44 is provided with an actuating coil 46 connected at its ends to respective portions of the conductor 30' and the switch 45 is provided with an actuating coil 47 connected at its ends to respective portions of the conductor 31'.

The operation of this modified system is similar to the operation of the system shown in Fig. 2, and no further description is deemed necessary.

Fig. 4 shows a modification of the embodiment of Fig. 3, and similar parts are here indicated by similar reference numerals with double accents added. In this embodiment the second and third motors (armatures), for convenience, are shown in reverse order as in Fig. 3, and the various motors are connected in parallel instead of in series as in the former embodiments.

The conductors 14" and 15" are connected by conductors 48, 49, 50 and 51 and the armatures 1", 2", 3" and 4" of the motors are respectively in these conductors. The field 5" is shunted by shunt 52, and the field 7" is shunted by the shunt 53, each of these shunts including a common conductor 54 in which is the switch 44". The field 6" is shunted by a shunt 55 and the field 8" is shunted by a shunt 56, each of these shunts including a common conductor 57 in which is the switch 45". This modification resembles the embodiment of Fig. 3 in that but one switch is employed for two fields. Although four shunts are employed as in the embodiment of Fig. 2, the operation however is substantially like that of the embodiment of Fig. 3 and no detailed description thereof is thought necessary.

Fig. 5 shows a further modification. In Fig. 5 the current is supplied to the respective pairs of motors (armatures) from separate sources and to this extent the system may be considered as comprising two separate units. As these two units are similar a detailed description of one will suffice. Parts bearing new reference numerals will be indicated in the other unit by the same reference numeral with an accent added, or if old reference numerals are employed three accents are added. Referring in detail to the unit at the right in Fig. 5 which includes the armatures 1''' and 3''', these armatures are connected in series.

While it will be understood that the current supplied to the two separate units may, if desired, come from the same source, this embodiment is especially designed to supply the current for each unit from a separate source which may be any separate source desired. In the preferred exemplification of this embodiment the separate sources are dynamos. Accordingly in the unit now being described, the dynamo, indicated by the reference numeral 58, driven by an engine such as an internal combustion engine, indicated at 59, is employed. This dynamo supplies the main circuit which comprises the conductors 60, 61, 62, 63 and 64. Armature 1''' is connected to conductors 61 and 62, and armature 3''' is connected to conductors 62 and 63.

The shunts of the units of this embodiment are similar to those of the embodiment of Fig. 3 in that each includes two fields. The actuating coils of the switches of the shunts are in auxiliary circuits similar to those of the embodiment of Fig. 3 except as hereinafter particularly noted. Therefore a detailed description of these auxiliary circuits is not deemed necessary.

The fields 5''' and 7''' are shunted by a shunt 42''' including a control switch 44'''. The actuating coil for the switch 44''' is indicated by the reference numeral 65.

The unit comprises a relay 66 and the other unit comprises a similar relay 66'. Therefore in the present embodiment no relay is provided in the conductor 35''' as in the former embodiments where a single relay was employed, but instead the relay 66 is disposed in conductor 30''' and the relay 66' of the other unit is similarly disposed. The coil 67 of relay 66 is connected at one end thereof by a conductor 68 to conductor 60, and at the other end thereof by conductor 69 to conductor 64. It will be understood that separate controls (not shown) may be employed in the two units in the usual manner.

The operation of this embodiment is similar to the operation of the other embodiments previously described and no further description is deemed necessary.

Fig. 6 is a modification of the embodiment of Fig. 5. The fields of the dynamos 58 and 58' are shown diagrammatically and indicated by the reference numerals 70 and 70'. These fields may be self-excited but in the present instance the field 70 is shown in a circuit comprising a source of current supply such as a battery 71, a resistance 72 and a conductor 73. The field 70' is in a similar circuit. The fields 70 and 70' are of the differential type wherein cutting out resistance decreases the current supplied by the dynamo. This embodiment differs from that of Fig. 5 in that portions of the resistances 72 and 72' of the fields 70 and 70' are shunted instead of the fields 5''', 7''' and 6''', 8'''. It will be understood that by shunting these resistances a similar result will be obtained as far as decreasing the power supplied to the forward motors at starting speeds is concerned.

If desired a field for the dynamo may be employed wherein added resistance will decrease the current supplied by the dynamo. In such cases the control switch of the shunt will operate in the reverse order, namely where a decrease in current supply is desired, the switch of the shunt instead of closing, as shown in Fig. 6, to decrease the current by cutting out resistance, will open to increase the resistance, the switch being modified in construction in a well-known manner to operate in this reverse order.

In Fig. 6 relay 66 may be used to operate an electric device which controls the governor on engine 59 instead of switch 44' which controls the power of dynamo 58. In a similar manner the unit at the left of Fig. 6 may be modified.

While in Figs. 2 to 5 inclusive the fields have been shunted, it will be understood that it is within the purview of the invention to shunt the armatures instead, or shunt both armatures and fields.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. In an electric railway vehicle, a pair of wheeled driving axles; an electric motor for driving the forward axle of said pair; means for supplying operating electric current to said motor; shunt means including an electrically operated control operable to render said shunt means operative to decrease the supply of current to said motor; and means operative for supplying electric current to said control to effect said operation thereof, including a relay having electrical association with said current supplying means for said motor for receiving current therefrom, said relay being adapted to automatically effect said operation of said current supplying means for said control when said relay is receiving its said current at starting speeds of said vehicle, whereby said operation of said shunt will be effected at said speeds.

2. In an electric railway vehicle, a pair of wheeled driving axles; an electric propelling motor for each of said axles; means for supplying operating electric current to said motors; shunt means including an electrically operated control operable to render said shunt means operative to decrease the supply of current to the motor of the forward axle of said pair; and means operative for supplying electric current to said control to effect said operation thereof, including a relay having electrical association with said current supplying means for said motors for receiving current therefrom, said relay being adapted to automatically effect said operation of said current supplying means for said control when said relay is receiving its said current at starting speeds of said vehicle, whereby said operation of said shunt will be effected at said speeds.

3. In an electric railway vehicle, a pair of wheeled driving axles; an electric motor for driving the forward axle of said pair, said motor being provided with a field winding; means for supplying operating electric current to said motor; a shunt for said field winding including an electrically operated control operable to render said shunt operative to decrease the supply of current to said motor; and means operative for supplying electric current to said control to effect said operation thereof, including a relay having electrical association with said current supplying means for said motor for receiving current therefrom, said relay being adapted to automatically effect said operation of said current supplying means for said control when said relay is receiving its said current at starting speeds of said vehicle, whereby said operation of said shunt will be effected at said speeds.

4. In an electric railway vehicle, a truck having a pair of wheeled driving axles; another truck having a pair of wheeled driving axles; two electric propelling motors, one for each of the forward axles of said pairs; means for supplying operating electric current to said motors; two shunts, one for each of said motors, each including an electrically operated control operable to render its respective shunt operative to decrease the supply of current to its respective motor; and means operative for supplying electric current to said controls to effect said operation thereof, including a relay having electrical association with said current supplying means for said motors for receiving current therefrom, said relay being adapted to automatically effect said operation of said current supplying means for said controls when said relay is receiving its said current at starting speeds of said vehicle, whereby said operation of said shunts will be effected at said speeds.

5. In an electric railway vehicle, a truck having a pair of wheeled driving axles; another truck having a pair of wheeled driving axles; two electric propelling motors, one for each of the forward axles of said pairs; means for supplying operating electric current to said motors; a single shunt for said motors, including an electrically operated control operable to render said shunt operative to decrease the supply of current to said motors; and means operative for supplying electric current to said control to effect said operation thereof, including a relay having electrical association with said current supplying means for said motors for receiving current therefrom, said relay being adapted to automatically effect said operation of said current supplying means for said control when said relay is receiving its said current at starting speeds of said vehicle, whereby said operation of said shunt will be effected at said speeds.

6. In an electric railway vehicle, a truck having a pair of wheeled driving axles; another truck having a pair of wheeled driving axles; two electric propelling motors, one for each of the forward axles of said pairs; means for supplying operating electric current to said motors; a shunt for each of said motors, said shunts having a common electrically operated control operable to render both of said shunts operative to decrease the supply of current to said motors; and means operative for supplying electric current to said control to effect said operation thereof, including a relay having electrical association with said current supplying means for said motors for receiving current therefrom, said relay being adapted to automatically effect said operation of said current supplying means for said control when said relay is receiving its said current at starting speeds of said vehicle, whereby said operation of said shunts will be effected at said speeds.

7. In an electric railway vehicle, a truck having a pair of wheeled driving axles; another truck having a pair of wheeled driving axles; an electric propelling motor for each of said four axles; a main circuit including a dynamo for supplying operating electric current to the forward motors of said trucks; shunt means for shunting said forward motors including electrically operated control means operable to render said shunt means operative to decrease the supply of current to said forward motors; a second main circuit including a second dynamo for supplying operating electric current to the rear motors of said trucks; a second shunt means for shunting said rear motors including a second electrically operated control means operable to render said second shunt means operative to decrease the supply of current to said rear motors; and means operative for supplying electric current selectively to either one of said control means to effect its said operation including switching means operable to effect said selection, a relay having electric association with the first said main circuit for receiving current therefrom, said relay being adapted to automatically effect said operation of said current supplying means when selected to supply current to said first control means, when said relay is receiving its said current at starting speeds of said vehicle, whereby said operation of said first mentioned shunt means will be effected at said speeds, and a second relay having electric association with the second said main circuit for receiving current therefrom, said second relay being adapted to automatically effect said operation of said current supplying means when selected to supply current to said second control means, when said second relay is receiving its said current at starting speeds of said vehicle, whereby said operation of said second shunt means will be effected at said speeds.

8. In an electric railway vehicle, a truck having a pair of wheeled driving axles; another truck having a pair of wheeled driving axles; an electric propelling motor for each of said four axles; a main circuit including a dynamo for supplying operating electric current to the forward motors of said trucks; shunt means for said dynamo including electrically operated control means operable to render said shunt means operative to decrease the supply of current to said forward motors; a second main circuit including a second dynamo for supplying operating electric current to the rear motors of said trucks; a second shunt means for said second dynamo including a second electrically operated control means operable to render said second shunt means operative to decrease the supply of current to said rear motors; and means operative for supplying electric current selectively to either one of said control means to effect its said operation including switching means operable to effect said selection, a relay having electric association with the first said main circuit for receiving current therefrom, said relay being adapted to automatically effect said operation of said current supplying means when selected to supply current to said first control means, when said relay is receiving its said current at starting speeds of said vehicle, whereby said operation of said first mentioned shunt means will be effected at said speeds, and a second relay having electric association with the second said main circuit for receiving current therefrom, said second relay being adapted to automatically effect said operation of said current supplying means when selected to supply current to said second control means, when said second relay is receiving its said current at starting speeds of said vehicle, whereby said operation of said second shunt means will be effected at said speeds.

ROBERT T. SAWYER.